UNITED STATES PATENT OFFICE.

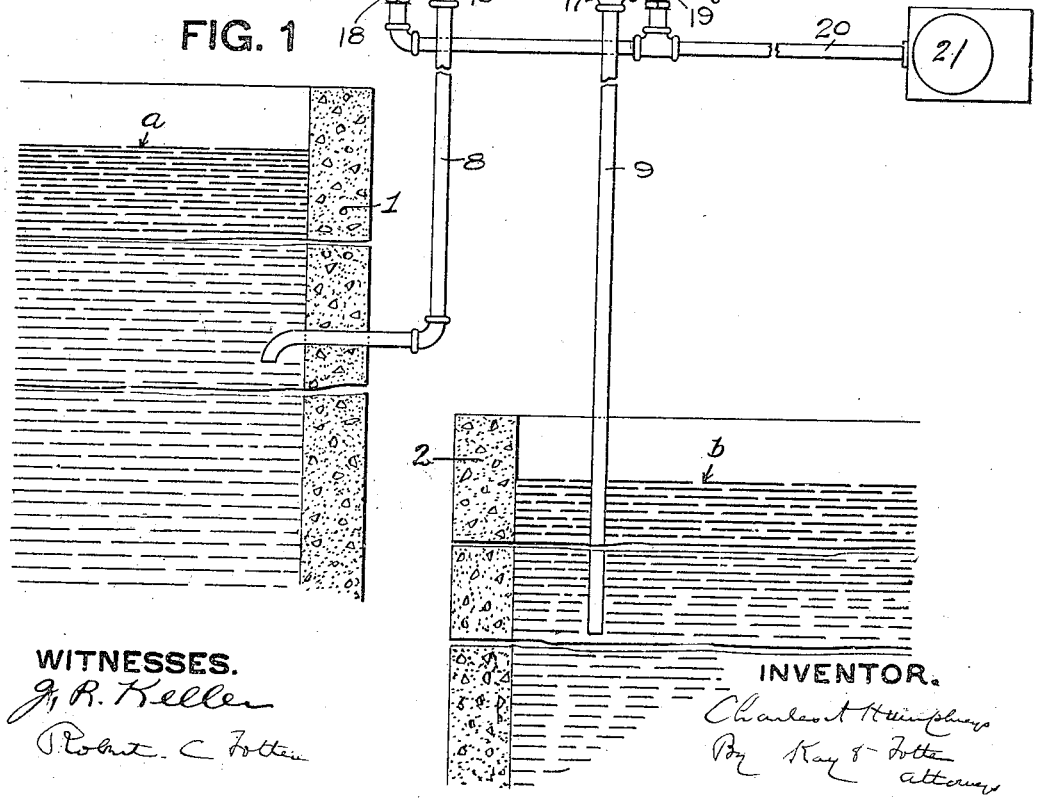

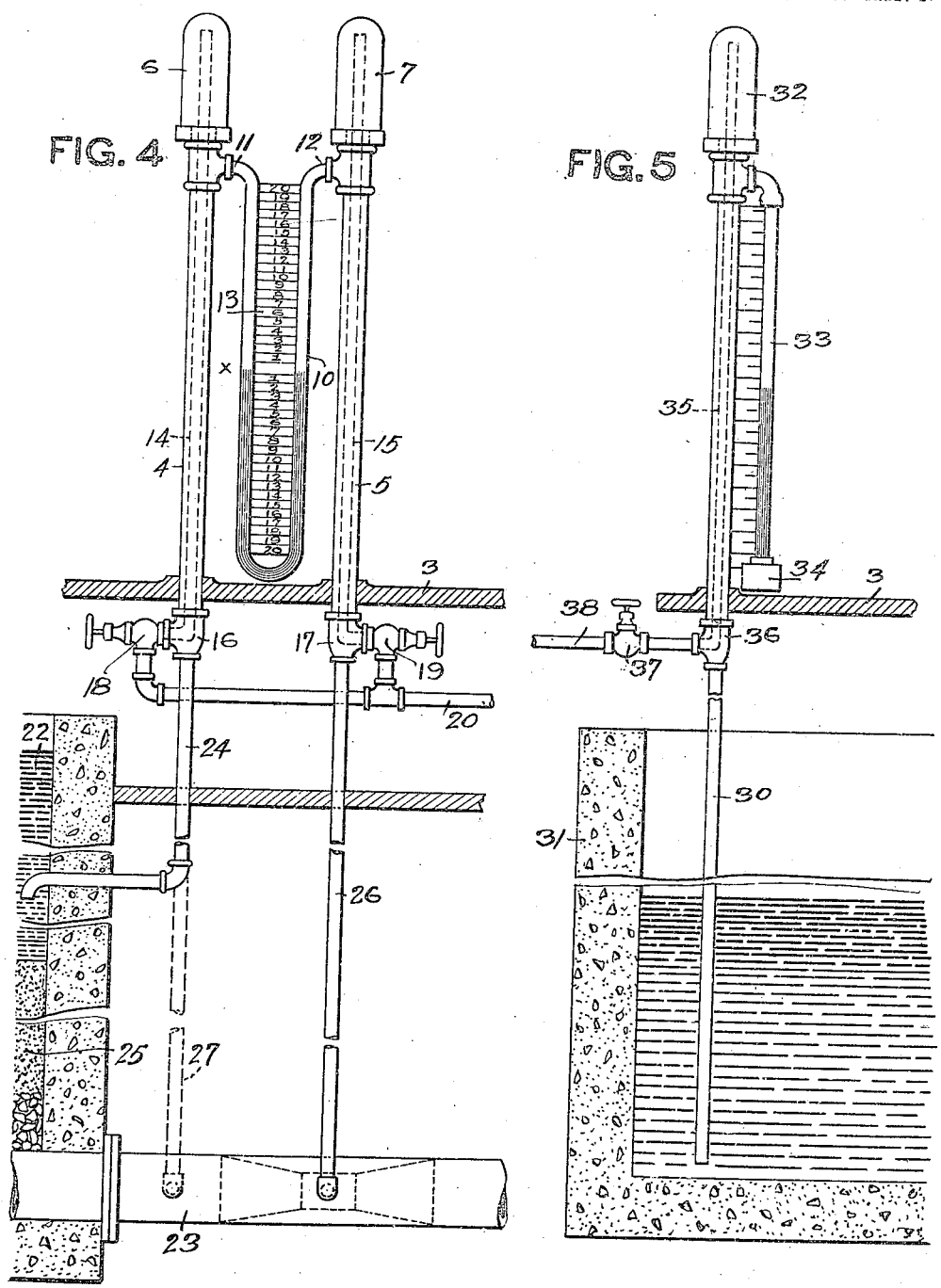

CHARLES A. HUMPHREYS, OF CARRICK, PENNSYLVANIA.

GAGE.

1,254,141.   Specification of Letters Patent.   Patented Jan. 22, 1918.

Application filed February 7, 1912. Serial No. 676,159.

*To all whom it may concern:*

Be it known that I, CHARLES A. HUMPHREYS, a citizen of the United States, and resident of Carrick, in the county of Allegheny and State of Pennsylvania, have invented a new and useful Improvement in Gages; and I do hereby declare the following to be a full, clear, and exact description thereof.

This invention relates to gages or indicators, and is particularly concerned with devices of this character for ascertaining differences in pressures between liquids at different levels or at different points. In gages as heretofore constructed for this purpose, the gage has necessarily been located below the level of liquid, or where the liquid was confined and under pressure it has been located below the elevation to which liquid would rise under the pressure at which it is carried. The object of this invention is to provide means for indicating the pressure in liquids at any desired elevation above the surface thereof where the liquid is unconfined, or if confined, at a point higher than the pressure thereof would raise the liquid. A further object is to provide for the simple means for maintaining the gage at proper condition for operation, or testing the gage.

To these ends the invention consists in a riser tube extending from the holding vessel or pipe at a point below the level of the liquid therein up to the desired height, a gage tube connected with said riser tube and containing a gaging liquid and vacuum producing apparatus for exhausting the air within the riser tube and the gage tube, thereby raising the liquid and filling the riser tube and gage tube, so that the pressure of the liquid can be indicated at any desired point above the level of the liquid to be measured. It also comprises the employment of two vessels or receptacles and two riser tubes leading upwardly therefrom and both connected to the gage containing the gaging liquid, together with means for exhausting the air from the riser tube and gage so that the difference in pressure or elevation of the liquid in the two receptacles can be indicated. It also comprises certain other improvements as hereinafter set forth.

In the accompanying drawings Figure 1 shows the gage apparatus in elevation in connection with two tanks or receptacles containing liquid at different levels; Fig. 2 is a vertical section of the upper end of one of the riser tubes; Fig. 3 is a horizontal section on the line 3—3 Fig. 1; Fig. 4 illustrates the invention as employed for measuring the velocity of flow such as in a Venturi tube; and Fig. 5 illustrates the invention as employed to indicate the depth of liquid within the tank.

In the embodiment of my invention herein selected for illustration 1 indicates a vessel or receptacle for liquid, the liquid being at the level $a$. 2 indicates a second vessel in which the liquid is at the level $b$. 3 indicates in section a suitable stand or table for supporting the gage apparatus although it is to be understood that this support may take any other desired form. Mounted within or upon the support 3 are the airtight tubes or gage standards 4 and 5, respectively, each terminating in an air-tight chamber 6 and 7, respectively, preferably of glass. The tube 4 is connected by means of a pipe 8 with the vessel or receptacle 1, said tube either entering the vessel at any suitable point, such as from the top as in the tank 2, or from the side and opening into the vessel at some distance below the normal level of the liquid therein as in the tank 1. The tube or standard 5 is correspondingly connected by a pipe 9 with the vessel 2 as shown. The U-shaped gage tube proper 10 has one of its legs connected at 11 with the tube 4 and the chamber 6, and the other leg 12 is connected with the tube 5 and chamber 7. This gage tube may be partially filled with any liquid, which is of high specific gravity relatively to that of the liquid the levels of which are to be ascertained, for example in the vessels 1 and 2, and which will not mix with this liquid, for example with mercury. Between the arms of the gage tube is located a gage scale 13 properly graduated to give the necessary indications. Within the tubes or gage standards 4 and 5 are the pipes 14 and 15, respectively, each of which emerges from the tube through T's 16 and 17, respectively, and are connected by means of valves 18 and 19 and the pipe 20 with any suitable vacuum producing apparatus, such as a vacuum pump 21. These vacuum pipes 14 and 15 extend well up into the glass chambers 6 and 7, terminating just below the upper portions thereof.

The operation of the apparatus in the form so illustrated is as follows: With the extremities of the pipes 8 and 9 immersed in the liquids in the tanks 1 and 2, respectively, the valves 18 and 19 are opened and by a suitable suction means such as the vacuum pump 21, the air is withdrawn from the tubes 4 and 5 and the chambers 6 and 7 as well as the gage tube 10, whereupon the liquid from the tank 1 will rise and fill the tube 4, chamber 6 and gage tube 10 on the side 11, while liquid from the tank 2 will fill tube 5 and chamber 7 and the gage tube on the side 12. The valves may be kept open until the liquids flow over the tops of the pipes 14 and 15, respectively, and fill the chambers 6 and 7, whereupon the valves are closed. It will readily be seen that with the rarefaction of the air in the tubes 8, 9, 4, 5, the chambers 6 and 7 and the U-shaped tube 10, all the air has been extracted from the inner portions of the gage down to the valves 18 and 19 and when said valves are closed the gage will then be in condition for operation. With the parts in the conditions described the mercury or other gage liquid on the side of the pipe which is immersed in the water having the elevation $a$ will be depressed below the normal level, say, $x$ for example, while in the side of the gage tube toward the pipe 9 which is immersed in a liquid at the level $b$, the mercury or gage liquid will rise above this line $x$. The graduated scale 13 may be so calibrated as to show in feet or inches, or any other standard measurement, the water or other liquid as related to the gage liquid, to indicate the difference in heights between the elevation $a$ of the liquid in the tank 1, and the elevation $b$ of the liquid in the tank 2.

The invention may be employed in different ways, for example, as shown in full lines in Fig. 4 it may be employed as a loss of head gage in filtration systems. In such case 22 is the filter tank and 23 the effluent pipe, the pipe 24 on one side of the gage leading into the filter tank above the filter bed 25 thereof and the pipe 26 leading down into the effluent pipe, the other parts being as illustrated in Figs. 1 to 3, and the apparatus indicating loss of head through the filter. On the same figure I have illustrated the invention as applied to a Venturi tube to indicate the flow of water through the same, in which case the pipe 24 is carried down as indicated by dotted lines at 27 into the tube 23 and that tube is reduced in diameter as also indicated in dotted lines and the tube 26 connected to it so that the volume of the current is indicated on the gage, the difference in pressure being calculated according to a well known rule. In Fig. 5 the invention is illustrated in connection with a single tube for indicating the depth of water in a tank. In such case the riser tube 30 extends from a point near the bottom of the tank 31 up to the desired level, entering within the air-tight chamber 32 and communicating with the single gage tube 33, the lower end of which enters mercury pot 34, which is open to the atmosphere in the ordinary way, as for example in a barometric tube. The suction pipe 35 enters at the elbow 36 and extends up through the riser 30 into the air-tight chamber 32, said pipe having the valve 37 in the pipe 38 which leads to the vacuum pump. In this case, it is evident that by opening the valve 37 and by a suitable pump drawing the air through the suction pipe 35, the water or other liquid in the tank will be raised up into the air-tight chamber 32 and will fill the gage pipe 33 above the mercury or other indicating liquid therein and the depth of the liquid in the tank will be indicated as in the other cases described.

The above clearly illustrates the different uses to which the invention may be applied, it being understood that it may be employed in any suitable place where a gage to indicate the depths or levels of any liquid is to be placed above an open tank, or to a higher point than it would be naturally raised by the liquid within a confined pipe.

In the above described apparatus it will be seen that the apparatus may be successfully operated at any height above the levels of the liquid within the limits of atmospheric pressure where the liquids are contained in open vessels or at any height above the levels of the liquids when confined in proportion to the pressure upon the surfaces thereof. In the latter case it will be seen that the gage may also become an indicator of variations in pressure in the vessels in which the liquids are respectively confined.

While I have herein described the particular embodiment of my invention it is to be understood that the same may be altered in details and in arrangement of parts within the scope of the appended claims.

What I claim is:

1. The combination with a vessel containing liquid, of a riser tube extending into said vessel below the level of the liquid therein and extending upwardly above the same, said riser tube having a sight glass adjacent the upper end thereof, a gage having one end connected with said riser tube below said sight glass and containing a gaging liquid, an exhaust tube communicating with the riser tube above the gage tube, and a suitable pump communicating with said exhaust tube.

2. The combination with a receptacle for liquid, a riser tube extending into said vessel or receptacle below the level of the liquid therein and thence to the desired height and having an air-tight chamber at the top thereof, and communicating near its top with a gage tube containing a gaging liquid, an exhaust tube entering within the riser tube below the entrance of the gage tube and extending therein up into said air chamber above the said gage tube, and a vacuum producing apparatus communicating with the exhaust tube.

In testimony whereof, I the said CHARLES A. HUMPHREYS have hereunto set my hand.

CHARLES A. HUMPHREYS.

Witnesses:
ROBERT C. TOTTEN,
JOHN F. WILL.

Copies of this patent may be obtained for five cents each, by addressing the "Commissioner of Patents, Washington, D. C."